UNITED STATES PATENT OFFICE.

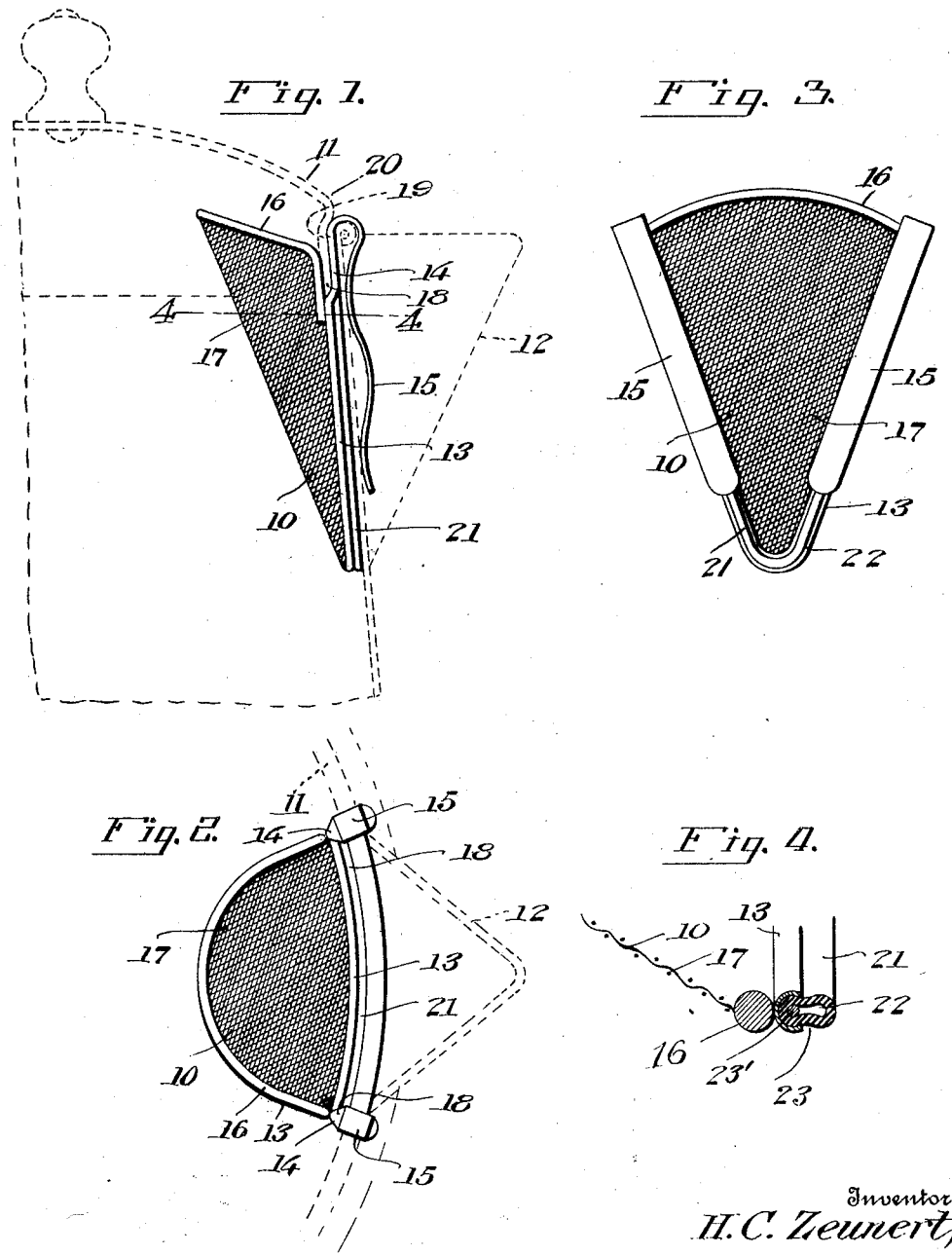

HANS C. ZEUNERT, OF CHICAGO, ILLINOIS.

STRAINER FOR COFFEE-POTS.

1,113,859. Specification of Letters Patent. Patented Oct. 13, 1914.

Application filed February 7, 1914. Serial No. 817,236.

*To all whom it may concern:*

Be it known that I, HANS C. ZEUNERT, a citizen of the United States, residing at Chicago, in the county of Cook and State of Illinois, have invented new and useful Improvements in Strainers for Coffee-Pots, of which the following is a specification.

An object of the invention is to provide a strainer for use with coffee or tea pots and similar receptacles.

The invention contemplates, among other features, the provision of a strainer of a simple and durable construction which can be cheaply manufactured and which can be readily applied to and as conveniently removed from the coffee pot or other receptacle on which it is adapted to be used.

A still further embodiment of the invention resides in a strainer which is adapted to lie within the pot and cover the outlet of the spout so that when a fluid is poured from the pot by way of the spout coffee dregs or other foreign matter will be prevented from passing outwardly through the spout with the fluid.

In the further disclosure of the invention reference is to be had to the accompanying drawings, constituting a part of this specification, in which similar characters of reference denote corresponding parts in all the views, and in which:

Figure 1 is a side elevation of the device, showing the same applied to a coffee pot and which is represented in dotted lines; Fig. 2 is a plan view of the strainer as applied to the coffee pot disclosed in Fig. 1, the cover of the coffee pot having been previously removed; Fig. 3 is a front elevation of the strainer; and Fig. 4 is an enlarged horizontal sectional view taken through the frame of the strainer.

Referring more particularly to the views, I disclose a strainer 10 adapted for use in connection with a pot 11 and which is adapted to be applied thereto so as to lie within the pot and extend across the outlet opening from the pot to the usual spout 12 thereof. The strainer 10 consists more particularly of a frame 13 of a substantially V-shape, with the upper ends 14 of the V-shaped portion of the frame offset, as shown, and then bent upon themselves to form a series of spring-like gripping members 15 depending adjacent to and immediately in front of the frame 13.

An auxiliary frame 16 substantially U-shaped is secured to the frame 13 in any convenient manner and adjacent to the upper ends 14 of the frame 13 so that there will be a space between the upper ends 14 of the frame 13 and the inner ends of the auxiliary frame 16. A screen 17 preferably of wire cloth is secured to the frame 13 and the auxiliary frame 16 as shown and in the use of the strainer in connection with the pot 11, the strainer is applied to the pot so that the screen 17 will lie within the pot and extend across the outlet to the spout 12, with the spring-like gripping members 15 projecting over the edge of the pot on both sides of the spout and gripping the exterior face thereof, thus rigidly holding the strainer in position.

As mentioned heretofore, when the auxiliary frame 16 is arranged upon the frame 13 there is provided a space between the inner end of the auxiliary frame and the upper ends 14 of the frame 13 and which are offset, as has also been mentioned heretofore, thus providing a seat 18 so that the usual circular depending flange 19 of a cover 20 for the pot 11 can be received in the mentioned space and have its lower end repose upon the seat 18 formed by offsetting the upper portions of the ends 14 of the V-shaped frame 13. It will of course be understood that the cover 20 is made sufficiently small so that its circular depending flange will readily fit into the top of the pot to allow sufficient clearance for the ends 14 of the frame 13. Thus with a device of the character described and shown the cover of the pot can be readily positioned thereon without in any manner interfering with the proper operation of the strainer and likewise the strainer will in no manner interfere with the proper positioning of the cover upon the pot.

In order to insure a tight fit between the edges of the frame and the inner face of the pot, on both sides of the spout 12, I provide a sealing member 21 and which is adapted to effect a seal between the main portion of the frame 13 and the inner face of the pot so as to prevent the coffee dregs or other foreign matter from passing into the spout. The mentioned sealing member 21 consists, more particularly, of a rubber tube 22 and which is adapted to be compressed along its medial longitudinal portion in order that one-half of the tube can be arranged within the frame 13 and which is preferably formed of a tubular material having a longitudinal slot 23 in order that the tube 22 can be arranged therein as shown in the views, it being understood that the ends of the tube lie adjacent to the offset portions of the frame. Now in order to hold the sealing member 21 in position to accomplish the desired result a securing member 23' in the nature of a piece of wire and of a diameter sufficiently large to permit of its being inserted in that portion of the tube which lies within the slotted tubular portion of the frame, is placed as shown in the views, thus locking a portion of the tube within the frame, whereas the other portion will project outwardly beyond the frame and effect the desired seal between the V-shaped portion of the frame and the inner face of the pot when the strainer is applied thereto.

From the foregoing description it will be apparent that the strainer described involves few and simple parts, can be cheaply manufactured and will effectively accomplish the result for which is is intended.

It will be understood that I do not limit myself to the particular construction disclosed in the views and described in the specification; that various departures can be made from the construction set forth herein without departing from the spirit of the invention and that the scope of the invention is defined by the appended claims.

Having thus described my invention, I claim:

1. In a strainer for a receptacle having a cover, a main frame, an auxiliary frame carried by the first mentioned frame, a screen supported on the said frames, means for supporting the main frame upon the receptacle, and a seat formed by offsetting portions of the main frame, between the body thereof and the said auxiliary frame, with portions of the cover of the receptacle adapted to engage the seat and lie between the main frame and the said auxiliary frame.

2. In a strainer for a receptacle having a cover, a main frame, an auxiliary frame carried by the first mentioned frame, a screen supported on the frames, means for supporting the said main frame upon the receptacle, a seat formed by offsetting portions of the main frame, between the body thereof and the said auxiliary frame, with portions of the cover of the receptacle adapted to engage the seat and lie between the main frame and the said auxiliary frame, and a sealing member carried by the main frame and adapted to engage the inner face of the receptacle to effect a seal between the main frame and the receptacle.

In testimony whereof I affix my signature in presence of two witnesses.

HANS C. ZEUNERT.

Witnesses:
M. J. ZEUNERT,
L. A. WITT.

---

Copies of this patent may be obtained for five cents each, by addressing the "Commissioner of Patents, Washington, D. C."